United States Patent [19]

Gortsema et al.

[11] Patent Number: 4,913,798
[45] Date of Patent: Apr. 3, 1990

[54] HYDROCRACKING CATALYTS AND PROCESSES EMPLOYING SILICOALUMINOPHOSPHATE MOLECULAR SIEVES

[75] Inventors: Frank P. Gortsema, Pleasantville; Regis Pellet, Croton-on-Hudson; Albert R. Springer, Yonkers; Jule A. Rabo, Armonk; Gary N. Long, Putnam Valley, all of N.Y.

[73] Assignee: UOP, Des Plaines, Ill.

[21] Appl. No.: 772,618

[22] Filed: Sep. 4, 1985

Related U.S. Application Data

[62] Division of Ser. No. 682,946, Dec. 18, 1984, abandoned.

[51] Int. Cl.$^4$ .................. C10G 47/04; C10G 47/20
[52] U.S. Cl. ................. 208/111; 208/112; 502/79; 502/210; 502/213; 502/214
[58] Field of Search ............. 208/111, 114, 112; 502/77, 79, 214

[56] References Cited

U.S. PATENT DOCUMENTS

| | | | |
|---|---|---|---|
| 3,236,762 | 2/1966 | Robo et al. | 208/111 |
| 3,527,691 | 9/1970 | Hodgson | 208/10 |
| 3,972,958 | 8/1976 | Garwood et al. | 208/10 |
| 4,035,285 | 7/1977 | Owen et al. | 208/10 X |
| 4,105,535 | 8/1978 | Peters | 208/10 X |
| 4,158,621 | 6/1979 | Swift et al. | 208/114 |
| 4,295,954 | 10/1981 | Mitchell | 208/10 |
| 4,310,440 | 1/1982 | Wilson et al. | 502/208 X |
| 4,344,838 | 8/1982 | Mitchell | 208/10 |
| 4,401,556 | 8/1983 | Bezman et al. | 208/111 |
| 4,431,527 | 2/1984 | Miller et al. | 208/111 X |
| 4,440,871 | 4/1984 | Lok et al. | 502/214 |
| 4,499,327 | 2/1985 | Kaiser | 585/640 |
| 4,504,382 | 3/1985 | Pine | 208/114 |
| 4,512,875 | 4/1985 | Long et al. | 208/114 |
| 4,517,074 | 5/1985 | Ward | 208/254 H |
| 4,551,236 | 11/1985 | Lok et al. | 208/114 |
| 4,666,876 | 9/1987 | Pellet | 502/65 |
| 4,683,050 | 9/1987 | Ward | 208/110 |
| 4,735,928 | 4/1988 | Best et al. | 502/66 |
| 4,857,495 | 8/1989 | Gortsema et al. | 502/214 |

OTHER PUBLICATIONS

"New Developments in Zeolite Science Technology", 7th International Zeolite Conference, 1986, Kodanala, Ltd., Tokyo, Japan, pp. 103–112.

*Primary Examiner*—Anthony McFarlane
*Attorney, Agent, or Firm*—Thomas K. McBride; Vince J. Vasta, Jr.

[57] ABSTRACT

Hydrocracking processes are disclosed using catalysts comprising silicoaluminophosphates of U.S. Pat. No. 4,440,871 characterized in the calcined form by an adsorption oxygen of at least 4 isobutane of at least 2 percent by weight at a partial pressure of 500 torr and a temperature of 20° C.

13 Claims, 12 Drawing Sheets

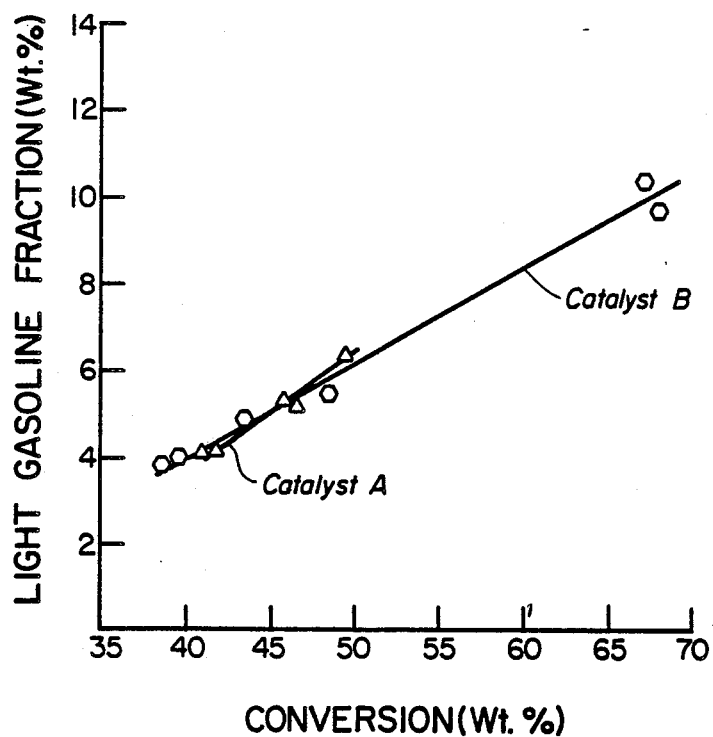
F I G. 1

HYDROCRACKING CATALYTS AND PROCESSES EMPLOYING SILICOALUMINOPHOSPHATE MOLECULAR SIEVES

This application is a division of prior U.S. application Ser. No. 682,946, filing date 12/18/84, now abandoned.

FIELD OF THE INVENTION

The present invention relates to hydrocracking catalysts comprising specific silicoaluminophosphate molecular sieves, and to processes employing such hydrocracking catalysts.

BACKGROUND OF THE INVENTION

The literature on such catalysts and processes is quite extensive. Certain technical areas have been addressed as of particular interest as is readily apparent based on the large numbers of patents on certain technical topics, e.g., the use of certain zeolites in hydrocracking catalysts. Representatives of the patents in this area are those relating to the use of AZM-type zeolites in hydrocracking and include: U.S. Pat. No. 3,894,934 (ZSM-5); U.S. Pat. No. 3,871,993 (ZSM-5, ZSM-11, ZSM-12 and ZSM-21); U.S. Pat. No. 3,702,886 (ZSM-5); U.S. Pat. No. 3,758,403 (ZSM-5 in combination with zeolite Y); and U.S. Pat. No. 3,972,983 (ZSM-20).

Although the aforementioned patents on the use of ZSM-type zeolites in hydrocracking catalysts are of interest the use of these zeolites has not been of significant commercial interest to date. The commercially significant activity in the hydrocracking area has been for the most part directed to further elaboration on the basic hydrocracking technology which has arisen in relation to zeolite Y, as disclosed in U.S. Pat. No. 3,130,007.

The development of hydrocracking catalysts based on a Y-type zeolite has taken many directions. Illustrative of the various processes which have arisen are those disclosed in the following patents:

U.S. Pat. No. 3,293,192 discloses a "synthetic ultra stable zeolitic aluminosilicate: of the Y-type" (see: U.S. Pat. No. 3,594,331 which discloses that Z-14HS is zeolite Y) which has been prepared by calcining a low alkali metal Y zeolite and successively base exchanging the calcined product with a base solution containing ammonium or complex amino salts until the alkali content is less than 1 weight percent and then calcining this product.

Although there has been extensive development of Y-type hydrocracking catalysts there has been little development of truly new hydrocracking catalysts based on the development of new molecular sieve components. This paradox, the lack of new catalytic materials despite the sizable economic interest, is readily understood by an appreciation of the fact that the work horse of the commercial hydrocracking business is zeolite Y. As a result, the patent literature discloses the clear preference towards improving zeolite Y.

The existence of zeolite Y and its use as a catalyst for hydrocracking processes is now well accepted if not, in fact, legendary. Still, the state of the art relating to zeolite Y and its use in hydrocracking catalysts has been generally limited to ion-exchange techniques, aluminum extraction techniques, catalyst formulation techniques and to secondary treatment processes which tend to remove aluminum from zeolite Y.

The instant invention is distinguished from the hydrocracking catalysts and processes of the prior art by employing a novel family of non-zeolitic molecular sieves which may be employed alone or in conjunction with the catalysts traditionally employed in hydrocracking processes. These novel non-zeolitic molecular sieves are unique in their ability to provide products with product distributions different from those obtained by use of catalysts derived from zeolitic aluminosilicates.

BRIEF DESCRIPTION OF THE DRAWINGS

FIG. 1 is a plot of the yield of the light gasoline fraction as a function of conversion for a reference catalyst (Catalyst A) and a catalyst (Catalyst B) of this invention.

SUMMARY OF THE INVENTION

Figure 2:
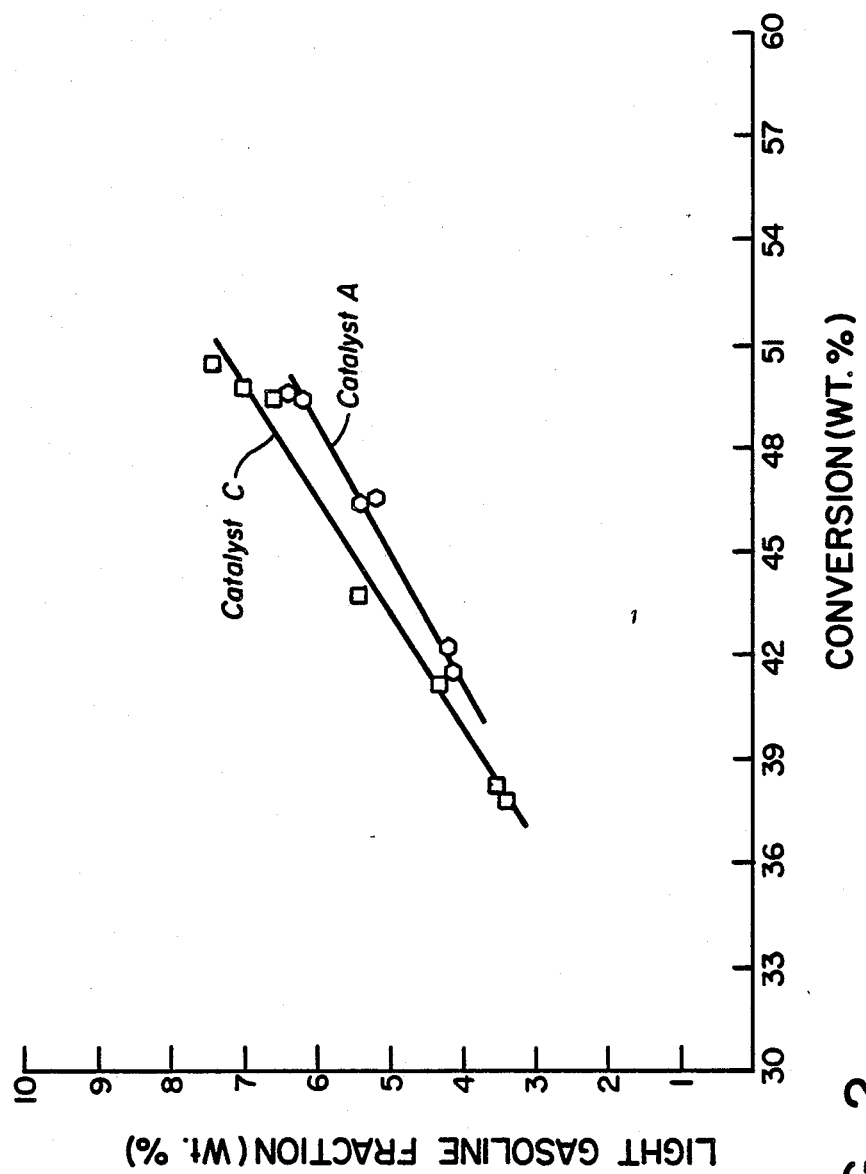
FIG. 2 is similar to FIG. 1 except Catalyst C, according to this invention, is depicted.

The present invention relates to hydrocracking catalysts and to processes employing such catalysts. The catalysts comprise at least one non-zeolitic molecular sieve, as hereinafter described, at least one hydrogenation component and, optionally, particles of a traditional hydrocracking catalyst having catalytic activity for hydrocracking hydrocarbon feedstocks e.g., particles of a traditional hydrocracking catalyst containing a zeolitic aluminosilicate(s) of the type generally employed in such hydrocracking catalysts. The class of silicoaluminophosphate molecular sieves employed in the instant invention are generally disclosed in U.S. Pat. No. 4,440,871 and are those members of the class further characterized in their calcined form by an absorption of oxygen of at least 4 percent by weight at a partial pressure of 100 torr and a temperature of −186° C. The traditional catalyst component, e.g., a catalyst containing a zeolitic aluminosilicate, if any, is characterized as being a hydrocracking catalyst component, such as heretofore traditionally employed in hydrocracking processes, e.g., catalysts containing the various forms of zeolite Y, etc. The catalysts and processes of this invention are unique in that specific silicoaluminophosphate molecular sieves are employed as catalysts in processes to provide product mixtures not obtained by the use of traditional hydrocracking catalysts.

DETAILED DESCRIPTION OF THE INVENTION

The present invention relates to the hydrocarbon conversion processes employing a catalyst containing at least one silicoaluminophosphate molecular sieve, as hereinafter described. Hydrocracking processes involve converting high boiling hydrocarbon feedstocks to lower boiling products by cracking high boiling hydrocarbon feedstocks and hydrogenating unsaturates in the feedstock.

Hydrocracking processes and the effective conditions for carrying them out are well known in the art (see: *Zeolite Chemistry and Catalysis*, by Jule A. Rabo, ACS Monograph 171, Chapter 13 (1976)) and are known to be of several general types. Two well known types include the single-stage type and the two-stage type. In the single-stage type (Unicracking-J.H.C. or Jersey Hydrocracking) process the feedstocks are pretreated to remove essentially all sulfur and nitrogen, e.g., by a hydrotreater, whereby desulfurization and denitrification are effected. The hydrocarbon stream is then hydrocracked in a reactor in the presence of a catalyst at a single pass conversion of between 40 and 70 percent. Any unconverted hydrocarbon may be recycled to extinction following scrubbing for ammonia removal and fractionation for separation of converted products. The two-stage process (Unicracking-JHC) has been developed which provides a second stage that employs the effluent from the single-stage type hydrocracking process (after passage through an ammonia scrubber) and from a second hydrocracking reactor as the input feed for a fractionation unit. The unconverted feedstock is then recycled to extinction in the second hydrocracking reactor. Because the catalyst in the second hydrocracking reactor operates in an essentially ammonia-free environment the rate of conversion in this reactor can be maintained at a higher lever, e.g. 60 to 80 percent and typically is carried out at a lower temperature than the first-stage reactor.

It has been found that the use of specific silicoaluminophosphate molecular sieves provide product distributions different from those obtained when such silicoaluminophosphate molecular sieves are not employed. The catalysts of this invention may be employed alone or in conjunction with conventional hydrocracking catalysts having activity at effective hydrocracking conditions. Heretofore, the hydrocracking catalysts of the prior art have required that certain penalties be endured for the optimization of particular process variables or product characteristics, e.g., octane. For example, an improvement in gasoline octane of the products, as indicated by an increased ratio of isoparaffins to normal paraffins, has been observed to occur with a concurrent decrease in gasoline yield and feed conversion when zeolitic aluminosilicate-based catalysts are employed. The isoparaffin to normal paraffin ratio has long been employed as an indication of higher octane products and its increase or decrease used as an indication of the octane of the gasoline product.

The increase in isoparaffins in relative amount to normal paraffins without significant increase, if any, in the loss in gasoline yield and feed stock conversion and is of significant commercial importance. This increase in the isoparaffin to normal paraffin ratio is particularly significant in the light gasoline fraction (products containing at least five carbons and boiling below 185° F.), since this fraction is not generally subjected to further processing to improve its octane number.

The silicoaluminophosphate molecular sieves employed in the instant invention are selected from the class of silicoaluminophosphate molecular sieves disclosed in U.S. Pat. No. 4,440,871 and are species further characterized in their calcined form by an adsorption of oxygen of at least 4 percent by weight at partial a pressure of 100 torr and a temperature of $-186°$ C. The silicoaluminophosphate molecular sieves are preferably characterized in their calcined form by an adsorption of isobutane of at least 2 percent by weight at a partial pressure of 500 torr and a temperature of 20° C. The non-zeolitic molecular sieves employed herein are most preferably characterized by one of the aforementioned adsorption criteria and also characterized in their calcined form by an adsorption of triethylamine from zero to less than 5 percent by weight, preferably less than 3 percent by weight, at a partial pressure of 2.6 torr and a temperature of 22° C.

The silicoaluminophosphate molecular sieves characterized by the above described adsorption criteria are selected from the class of silicoaluminophosphates disclosed in U.S. Pat. No. 4,440,871, incorporated by reference herein and as hereinafter described. The silicoaluminophosphate molecular sieves of U.S. Pat. No. 4,440,871 are microporous crystalline silicoaluminophosphates the pores of which are uniform and have nominal diameters of greater than about 3 Angstroms and whose essential empirical chemical composition in the as-synthesized and anhydrous form is

wherein "R" represents at least one organic templating agent present in the intracrystalline pore system; "m" represents the moles of "R" present per mole of $(Si_xAl_yP_z)O_2$; "m" has a value of from 0.02 to 0.3; "x", "y" and "z" represent the mole fractions of silicon, aluminum and phosphorus respectively, present as tetrahedral oxides, said mole fractions being such that they are within the pentagonal compositional area defined by points ABCD and E of the ternary diagram which is FIG. 1 of the drawings of U.S. Pat. No. 4,440,871. The SAPO molecular sieves of U.S. Pat. No. 4,440,871 are also described as silicoaluminophosphates having a three-dimensional microporous framework structure of $PO_2^+$, $AlO_2^-$ and $SiO_2$ tetrahedral units, and whose essential empirical chemical composition on an anhydrous basis is:

wherein "R" represents at least one organic templating agent present in the intracrystalline pore system; "m" represents the moles of "R" present per mole of $(Si_xAl_yP_z)O_2$ and has a value of from zero to 0.3; "m", "y" and "z" represent respectively, the mole fractions of silicon, aluminum and phosphorus present in the oxide moiety, said mole fractions being within the compositional area bounded by points A, B, C, D and E on the ternary diagram which is FIG. 1, said silicoaluminophosphate having a characteristic X-ray powder diffraction pattern which contains at least the d-spacings set forth below in any one of Tables I, III, V, VII, IX, XII, XVII, XXI, XXIII or XXV of U.S. Pat. No. 4,440,871. Further, such crystalline silicoaluminophosphates may be calcined at a temperature sufficiently high to remove at least some of any organic templating agent present in the intracrystalline pore system.

The silicoaluminophosphates of U.S. Pat. No. 4,440,871 are generally referred to therein as "SAPO-n", as a class, or as "SAPO-n" wherein "n" is an integer denoting a particular SAPO as its preparation is reported in U.S. Pat. No. 4,440,871. Accordingly, the catalysts of the instant invention will be referred to as "SAPO"-containing catalysts to denote catalysts containing one or more SAPO of U.S. Pat. No. 4,440,871 and characterized by the above described adsorption of oxygen, isobutane and, when appropriate, adsorption of triethylamine. SAPOs employable in the instant invention include, but are not limited to: SAPO-11, SAPO-17, SAPO-31, SAPO-33, SAPO-34, SAPO-35, SAPO-40, SAPO-41, SAPO-44 and mixtures thereof.

The above characterization of the SAPOs employed in the instant invention relates to an adsorption characterization that is carried out on a SAPO which has been subjected to a post synthesis treatment, e.g., calcination or chemical treatment, to remove a substantial portion of the template "R" which is present as a result of synthesis. Although a particular SAPO is characterized herein by reference to its adsorption of oxygen, isobutane or triethylamine as relating to the adsorption characteristics of a SAPO in its calcined form, the instant invention necessarily includes the use of non-calcined or modified SAPOs which are characterized by such adsorption in the calcined or modified form, since upon use of such a non-calcined SAPO in the instant process at effective hydrocracking conditions the SAPO will be calcined or hydrothermally treated in situ so as to have one or more of the characteristic adsorptions of oxygen, isobutane and triethylamine. Thus, the SAPO may be rendered in situ to a form characterized by the aforementioned adsorption characteristics and such is within the scope of the instant invention. For example, an as-synthesized SAPO-11 is not characterized by the aforementioned adsorption of isobutane due to the presence of template "R" which is present as a result of synthesis, although the calcined form of SAPO-11 is characterized by the aforementioned adsorption characteristics. Thus, reference to a SAPO as having a particular adsorption characteristic in its calcined form is not intended to exclude the use of the SAPO in its as-synthesized form which upon in-situ calcination, hydrothermal treatment and/or other treatment, e.g., ion exchange with suitable atoms, would have such adsorption characteristics.

As discussed above, it has been found that this class of SAPOs provides product distributions not observed by use of traditional hydrocracking catalysts. Heretofore, the hydrocracking catalysts of the prior art (containing zeolite) have generally exhibited a decrease in gasoline yield and/or conversion for the optimization of a particular process variable or product characteristic e.g., octane of the gasoline product. Such penalties are reduced by use of the instant catalysts. An increase in the isoparaffin to normal paraffin is desirable in gasoline products and an increase is an indication of higher octane products.

In addition to the above improvement in the octane of the gasoline products, the improvement in octane permits the use of base metal catalysts in processes where noble metal catalysts were heretofore required to obtain high octane products. Since base metal catalysts are generally more resistant to feed contaminants, sulfur-containing organic compounds, the instant invention provides more resistant catalysts without the octane penalty heretofore associated with base metal catalysts. When noble metal catalysts are employed with the instant SAPOs the instant invention further provides an improvement in the isoparaffin content of the gasoline products.

The catalysts of the instant invention may be employed in conjunction with traditional hydrocracking catalysts and may, optionally, be employed with a zeolitic aluminosilicate component. The zeolitic aluminosilicate component of such catalysts may be any aluminosilicate heretofore employed as a component in hydrocracking catalysts, e.g., forms of zeolite Y. Representative of the zeolitic aluminosilicates disclosed heretofore as employable as component parts of hydrocracking catalysts are Zeolite Y (including steam stabilized, e.g., ultra-stable Y), Zeolite X, Zeolite beta (U.S. Pat. No. 3,308,069), Zeolite KZ-20 (U.S. Pat. No. 3,445,727), Zeolite ZSM-3 (U.S. Pat. No. 3,415,736), faujasite, LZ-10 (U.K. Pat. No. 2,014,970, Jun. 9, 1982), ZSM-type zeolites, erionite, mordenite, offretite, chabazite, FU-1-type zeolite, NU-type zeolites and mixtures thereof. Traditional cracking catalysts containing amounts of $Na_2O$ less than about one percent by weight are generally preferred.

Y-type zeolites believed employable herein include, but are not limited to, those zeolite Y components disclosed in U.S. Pat. Nos.: 3,130,007; 3,835,032; 3,830,725; 3,293,192; 3,449,070; 3,839,539; 3,867,310; 3,929,620; 3,929,621; 3,933,983; 4,058,484; 4,085,069; 4,175,059; 4,192,778; 3,676,368; 3,595,611; 3,594,331; 3,536,521; 3,293,192; 3,966,643; 3,996,882 and 3,957,623.

Another zeolite aluminosilicate employable herein is "LZ-210", described in E.P.C. Publication No. 82,211 published Jun. 29, 1983, incorporated herein by reference thereto, and in U.S. Pat. No. 4,503,023 is "LZ-210", is described in E.P.C. by reference thereto. Publication No. 82,211 published Jun. 29, 1983, incorporated herein. In one embodiment the silica-to-alumina mole ratio is between about 7 and about 11 and preferably between about 8 and about 10. Hydrocracking catalysts containing LZ-210 are disclosed in copending U.S. Ser. No. 490,951, filed May 2, 1983, continued as U.S. Ser. No. 764,618, filed Aug. 12, 1985, which is now U.S. Pat. No. 4,735,928 incorporated herein by reference, and such may be employed herein as the optional traditional hydrocracking component.

The terms "ZSM-type" zeolites is generally employed in the art to refer to those zeolites denominated by the nomenclature "ZSM-n" where "n" is an integer. The ZSM-type aluminosilicates include but are not limited to ZSM-5, ZSM-11, ZSM-12, ZSM-23, ZSM-35, ZSM-38, ZSM-48; and other similar materials.

ZSM-5 is described in greater detail in U.S. Pat. No. 3,702,886 and Re 29,948. The entire descriptions contained within those patents, particularly the X-ray diffraction pattern of therein disclosed ZSM-5, are incorporated herein by reference.

ZSM-11 is described in U.S. Pat. No. 3,709,979. That description, and in particular the X-ray diffraction pattern of said ZSM-11, is incorporated herein by reference.

ZSM-12 is described in U.S. Pat. No. 3,832,449. That description, and in particular the X-ray diffraction pattern disclosed therein, is incorporated herein by reference.

ZSM-23 is described in U.S. Pat. No. 4,076,842. The entire content thereof, particularly the specification of the X-ray diffraction pattern of the disclosed zeolite, is incorporated herein by reference.

ZSM-35 is described in U.S. Pat. No. 4,016,245. The description of that zeolite, and particularly the X-ray diffraction pattern thereof, is incorporated herein by reference.

ZSM-38 is more particularly describing U.S. Pat. No. 4,046,859. The description of that zeolite, and particularly the specified X-ray diffraction pattern hereof, is incorporated herein by reference.

ZSM-48 is more particularly described in U.S. Pat. No. 4,423,021. The description of that zeolite, and particularly the specified X-ray diffraction pattern thereof, is incorporated herein by reference.

In addition, crystalline silicates such as silicalite (U.S. Pat. No. 4,061,724) may be employed with the SAPOs of the instant invention.

FORMULATION OF SAPO HYDROCRACKING CATALYSTS

The catalysts of the instant invention comprise at least one SAPO, as above characterized, a hydrogenation catalyst (component) and, optionally, one or more traditional hydrocracking catalyst components, including zeolitic aluminosilicate components and hydrogenation/cracking components such as a nickel and tungsten sulfide and the like. The relative amounts of the SAPO component and traditional hydrocracking component, if any, will depend at least in part, on the selected hydrocarbon feedstock and on the desired product distribution to be obtained therefrom, but in all instances an effective amount of at least one SAPO is employed. When a traditional hydrocracking catalyst (THC) component is employed the relative weight ratio of the THC to the SAPO is generally between about 1:10 and about 500:1, desirably between about 1:10 and about 200:1, preferably between about 1:2 and about 50:1, and most preferably is between about 1:1 and about 20:1.

The SAPO and THC, if any, may be ion-exchanged, impregnated and/or occluded with a selected cation(s) and/or thermally treated either before or after mixture with each other or after such have been added separately or concurrently to one or more inorganic oxide matrix components. When a SAPO is ion exchanged such is preferably exchanged with a hydrogen-forming cation species, e.g. $NH_4^+$, $H^+$, quaternary ammonium cation, etc. The SAPO preferably has at least part of its cations as hydrogen-forming cation species.

Any ion-exchange, impregnation and/or occlusion of the SAPO and/or THC, if any, which THC or SAPO may have been subjected to thermal treatment, may be carried out by contacting such with a solution of the selected cation, including those selected from the group of cations consisting of ammonium, Group IIA, Group IIIA, Group IIIB to VIIB and rare earth cations selected from the group consisting of cerium, lanthanum, praseodymium, neodymium, promethium, samarium, europium, gadolinium, terbium, dysprosium, holmium, erbium, thulium, ytterbium, lutetium and mixtures thereof. The exact nature of the relationship of rare earth cations and SAPO and their effect on the activity and/or selectively of the SAPO-containing catalysts is not clearly understood at present. As a result of ion-exchange and/or impregnation, the cation(s), e.g., rare earth cation, may replace at least a portion of the cations initially present in the SAPO and/or THC. The cations may be present in an effective amount which may be between about 0.1 weight percent and about 20 weight percent, typically between about 0.5 and about 10 weight percent, based on the weight of the starting SAPO and/or THC.

The hydrocracking catalysts of this invention contain an effective amount of at least one hydrogenation catalyst (component) of the type commonly employed in hydrocracking catalysts. The hydrogenation component is generally selected from the group of hydrogenation catalysts consisting of one or more metals of Group VIB and Group VIII, including the salts, complexes and solutions containing such. The hydrogenation catalyst is preferably selected from the group of metals, salts and complexes thereof of the group consisting of at least one of platinum, palladium, rhodium, iridium and mixtures thereof or the group consisting of at least one of nickel, molybdenum, cobalt, tungsten, titanium, chromium and mixtures thereof. As recognized in the art, noble and base metals are not generally employed in the same catalyst system of a hydrocracking catalyst although such are not excluded from the scope of this invention. Reference to the catalytically active metal or metals is intended to encompass such metal or metals in the elemental state or in some form such as an oxide, sulfide, halide, carboxylate and the like.

The hydrogenation catalyst is present in an effective amount to provide the hydrogenation function of the hydrocracking catalyst. When the hydrogenation catalyst is a noble metal it is generally present in an amount between about 0.05% and about 1.5% by weight based on the total weight of the catalyst, including the weight of any THC, binder or matrix material which may be present, as hereinafter discussed, although effective amounts outside this range may be employed. Although effective amounts in excess of 1.5 percent by weight may be employed, the preferred effective amount of hydrogenation component is between about 0.3% and about 1.2% by weight. When the hydrogenation catalyst is a base metal(s), expressed as the oxide, the effective amount will generally be between about 1.0% and about 30% percent by weight or more of the base metal oxide(s) based on the total weight of the catalyst, although effective amounts outside this range may be employed.

The final form of the hydrogenation component of the hydrocracking catalyst is not narrowly limited herein but may be a metal oxide, metal sulfide or other catalytically active form. Since sulfur is typically present in the hydrocarbon feedstock being treated, the actual form of some of the hydrogenation component(s) may well in some cases be at least in part a sulfide due to in situ reactions.

When a noble metal is employed as the hydrogenation component the catalyst is generally activated in air and then reduced in a hydrogen atmosphere. When a base metal is employed it is usually also treated with a sulfur compound.

The hydrogenation components can be incorporated into the overall catalyst composition by any one of numerous procedures. They can be added either to the SAPO component, THC component, if any, or to any other metal oxide component or to a combination thereof. In the alternative, multiple hydrogenation components (two or more) may be added as powders in the formulation of the catalyst. They may be added by co-mulling, impregnation, ion exchange or occlusion whereby one or more may be added to the SAPO and/or THC. For example, metal compounds such as the sulfides, oxides or water-soluble salts can be added by co-mulling, impregnation or precipitation of the catalyst components or a combination thereof before the composite is finally calcined. In the alternative these components can be added to the finished particle by impregnation with an aqueous, alcoholic, hydrocarbon, or other nonaqueous solution of soluble compounds or precursors. Impregnation or co-mulling are the preferred techniques when the hydrogenation component is a base metal while ion-exchange techniques are preferred when noble metals are employed as the hydrogenation component.

Although the hydrogenation components can be combined with the SAPO and/or THC components, if any, as the oxides, that is generally not the case. They are usually added as a metal salt which can be thermally converted to the corresponding oxide in an oxidizing atmosphere or reduced to the metal with hydrogen or other reducing agent. The composition can be sulfided by reaction with a sulfur donor such as carbon disulfide, hydrogen sulfide, hydrocarbon thiols, elemental sulfur, and the like, described above. The above oxidizing or sulfiding processes are generally carried out on catalyst compositions which have been partially dried (as desired), tableted, pelleted, extruded (with binder or matrix), or formed by other means and then calcined, e.g., at a temperature above 600° F., usually above 800° F.

It is well known in the art that hydrocracking catalysts are generally employed with a binder material or, as commonly referred to, with an inorganic oxide matrix which can be inert or also catalytically active. For example inorganic matrixes such as silica, alumina, silica-alumina, silica-zirconia, silica-magnesia, alumina-boria, alumina-titania and the like and mixtures thereof may be employed. An inorganic oxide need not always be employed or may be employed in an amount between about 5 wt. % and about 95 wt. % by weight, preferably between about 10 wt. % and about 80 wt. % based on the total weight of the hydrocracking catalyst.

The term "crude oil feedstock" is used in reference to hydrocracking processes and herein to denominate any crude oil feedstock or portion thereof and includes full range crude oils from primary, secondary or tertiary recovery from conventional or offshore oil fields and to the myriad of feedstocks derived therefrom. "Crude oil feedstocks" may also be "syncrudes" such as those that can be derived from coal, shale oil, tar sands and bitumens. The crude oil feedstock may be virgin (straight run) or generated synthetically by blending. Such crude oil feedstocks are traditionally desalted prior to use since sodium chloride is known to be a poison in many hydrocracking operations. Further, the term "crude oil feedstocks" is intended to include component parts of crude oils which have heretofore been generally employed as feedstocks or potential feeds and includes feeds such as distillate gas oils, heavy vacuum gas oils, VGO, atmospheric and vacuum resids, syncrudes, pulverized coal and fractions boiling above the traditional end of the gasoline boiling range which generally includes compounds containing greater than about eleven carbon atoms and combinations thereof.

In hydrocracking processes the hydrocarbon feedstock to be charged to the hydrocracking unit typically boils above 300° F., preferably between about 400° F. and 1200° F. and more preferably between about 400° F. and about 900° F. The hydrocarbon feed may be derived from many sources, above described including: catalytic cracking processes; coking processes; fractionators from crude oil; hydrocracking; pyrolysis processes; just to name a few. When operating a hydrocracking process to maximize gasoline production, the typical feedstock currently in commercial use has an end boiling point not greater than about 800° F. Typically, a light catalytic cycle oil, or a light virgin gas oil, or mixtures thereof, boiling in the range of from about 300° F. to 800° F. is employed as a feedstock. The feed may be pre-treated in a hydrotreater to effect hydrodenitrification and/or hydrodesulfurization. The feed may have a significant sulfur content, present as hydrogen sulfide, ranging from 0.1 to 3 weight percent, and the nitrogen content, present as ammonia, may be present in an amount up to 4000 parts per million (ppm) or more. Temperature, space velocity, and other process variables may be adjusted to compensate for the effects of nitrogen on the hydrocracking catalyst activity. The feedstock is contacted in the hydrocracking reaction zone with the hydrocracking catalyst in the presence of hydrogen-containing gas and/or a hydrogen generating compound. Hydrogen is consumed in the hydrocracking process and an excess of hydrogen is typically maintained in the reaction zone. Advantageously, a hydrogen-to-oil (feed) ratio of at least 1,000 standard cubic feet of hydrogen per barrel of feed (SCFB) is employed, and the hydrogen-to-oil ratio may range up to 20,000 SCFB, preferably, about 4,000 to 12,000 SCFB is employed. The hydrocracking reaction zone is typically operated under conditions of elevated temperature and pressure. The total hydrocracking pressure is usually between about 400 and about 4,000 pounds per square inch gauge (psig) and, preferably, between about 500 and 2000 psig. The hydrocracking reaction is exothermic and a temperature rise occurs across the catalyst bed. Therefore, the inlet temperature to the hydrocracking reaction zone may be 10° to 40° F. lower than the exit temperature. The average hydrocracking catalyst bed temperature is between about 450° F. and 800° F. depending on the presence or absence of $NH_3$ and the catalyst's age. The liquid hourly space velocity (LHSV) typically is between 0.2 and 5 volume of feed per hour per volume of catalyst, and preferably between 0.25 and 4 LHSV.

The following examples were carried out to demonstrate the use of the hydrocracking catalysts and processes of the instant invention and are not intended to be limiting thereof.

EXPERIMENTAL PROCEDURE

Hydrocracking catalysts were prepared as described in the following examples and tested for their utility as hydrocracking catalyst. The catalysts were employed as hydrocracking catalysts in a first stage hydrocracking process.

A selected catalyst was evaluated for hydrocracking by contacting the hydrocarbon feed (gas oil feed boiling between about 332° F. and about 853° F. (ASTM test method D-2887) and containing about 5,000 ppm sulfur and 2000 ppm nitrogen) with the selected catalyst. The feedstock has a density of 0.8341 g/cc at 60° F. The sulfur and nitrogen are present by adding 0.5 weight percent sulfur in the form of thiophene and 0.2 weight percent nitrogen in the form of t-butylamine to the feedstock, wherein the weight percents were based on the total weight of the feedstock. The hydrocracking process was carried out at a pressure of about 1450 psig and an temperature between about 685° F. and about 709° F. and at a LHSV (liquid hourly space velocity) of about 1.7. Hydrogen was introduced at a rate of about 8000 Standard Cubic feet of hydrogen per barrel of hydrocarbon feedstock.

The hydrocracking experiments were carried out by introducing a selected feedstock to a stainless steel reactor having an axial thermowell. The temperature in the reactor was monitored by thermocouple in the thermowell. The catalyst was in the form of extrudates and was placed in the reactor and mixed with quartz chips to minimize reactor hot spots.

The hydrocarbon feedstock employed in the following examples was a gas oil having an IBP (initial Boiling Point) of 332° F., a FBP (Final Boiling Point) of 853° F. and an API Gravity of 37.9. The feedstock contained less than 0.1 weight percent total nitrogen. Chemical analysis of the feedstock gave:

|  | Volume Percent |
| --- | --- |
| Total Aromatics | 24.7 |
| Monoaromatics | 19.0 |
| Diaromatics | 3.1 |
| Triaromatics | 1.2 |
| Tetraaromatics | 0.6 |
| Pentaaromatics | 0.8 |
| Total Saturates | 75.4 |

EXAMPLES 1 to 3

A reference catalyst (Catalyst A) and two catalysts according to this invention (Catalyst B and Catalyst C) were prepared as follows. All weights are on an anhydrous basis unless otherwise designated.

Catalyst A was prepared using a zeolitic aluminosilicate denominated LZ-210. The LZ-210 was prepared according to the disclosure of E.P.C. Publication No. 82,211 and had a $SiO_2$ to $Al_2O_3$ ratio of 9.0, was steamed at 600° C. in 100% steam for 1 hour and was ammonium exchanged by refluxing for 1 hour 1 pound of LZ-210 per pound of $NH_4NO_3$ (provided as a 10 percent by weight aqueous solution). Catalyst A was formed into a catalyst by mixing 140 grams of LZ-210 and 60 grams of a pseudoboehmite alumina (peptized with 4.2 milliliters of concentrated nitric acid in 60 ml. of water) and then mulling the mixture for 10 minutes. The mixture was formed into 1/16 inch extrudates, dried at 100° C. for about 10 hours and calcined at 500° C. in air for 2 hours. The calcination at 500° C. was carried out in a stepwise manner by heating the catalyst to 220° C. over a 1 hour period and then maintaining the catalyst at 220° C. for 1.5 hours, heating the catalyst from 220° C. to 500° C. over a one hour period and then heating the catalyst at 500° C. for 2 hours. The calcined extrudates were pore filled with a $Ni(NO_3)_2.6H_2O$ and ammonium metatungstate solution by mixing and then drying the resulting mixture. The final Catalyst A was prepared to contain the following weight percent (wt. %) of oxides: 5% NiO, 20% $WO_3$, 52.5% LZ-210 and 22.5% alumina.

Chemical analysis of Catalyst A for NiO and $WO_3$ gave 4.7 NiO wt. % and 20.8 wt. % $WO_3$ Catalyst B was prepared by employing SAPO-11 and LZ-210 in the formulation of a hydrocracking catalyst. SAPO-11 was prepared according to example 17 of U.S. Pat. No. 4,440,871 (except that the digestion time was 24 hours) and was employed in the as-synthesized form. The LZ-210 zeolite was the same LZ-210 employed in Catalyst A. Catalyst B was prepared by mulling 15.0 grams of SAPO-11 and 105 grams of the LZ-210 zeolitic aluminosilicate employed in Catalyst A. A solution containing 42.2 grams of ammonium metatungstate and 33.93 grams of $Ni(NO_3)_2.6H_2O$ in 100 cubic centimeters (cc) of water was added to the mixture of SAPO-11 and LZ-210. Pseudoboehmite alumina (30.0 grams peptized by mixing with 4.2 milliliter of concentrated nitric acid in 60 milliliters in water) was added to the above mixture and the resulting mixture extruded to give 1/16 inch extrudates. The extrudates were dried and calcined at 500° C. as described for Catalyst A. Catalyst B was prepared to contain the following weight percent oxides of: 5.0% NiO, 20% $WO_3$, 52.5% LZ-210, 7.5% SAPO-11 and 15% $Al_2O_3$. Chemical analysis of Catalyst B for NiO and $WO_3$ gave 4 wt. % NiO and 16 wt. % $WO_3$.

Catalyst C was prepared by employing SAPO-34 and LZ-210 to formulate the catalyst. SAPO-34 was prepared according to the procedure described in examples 32 to 38 of U.S. Pat. No. 4,440,871. The LZ-210 was the same steamed and ammonium-exchanged LZ-210 employed in the preparation of Catalyst A. Catalyst C was prepared by mixing 25.08 grams of SAPO-34 and 175 grams of LZ-210. The mixture was mulled for fifteen minutes and 53.8 grams of the same peptized alumina employed in Catalyst B added. The resulting mixture was then mixed for fifteen minutes. Water was then added to this mixture to form an extrudable mixture and 1/16 inch extrudates formed. The calcined extrudates were pore filled by mixing a solution containing 19.39 grams of $Ni(NO_3)_2.6H_2O$ and 24.2 grams of ammonium tungstate in 53 cc of water. The extrudates were then dried and calcined at 500° C. as described above for Catalyst A. Catalyst C was prepared to contain the following weight percent of oxides 5% NiO; 20% $WO_3$, 52.5% LZ-210, 7.5% SAPO-34 and 15 alumina. Chemical analysis of Catalyst C for NiO and $WO_3$ gave 4.99 wt. % NiO and 20.32 wt. % $WO_3$.

EXAMPLES 4 to 6

The catalysts prepared in examples 1 to 3 (Catalysts A, B and C) were evaluated as hydrocracking catalysts according to the above described procedure over a series of conversions as set forth below in Tables A, B and C. The products were analyzed and the light gasoline MON (Motor Octane Number) and RON (Research Octane Number) calculated using a volume average of $C_5$ and $C_6$ products using the octane values in ASTM report "Knocking Characterization of Pure Hydrocarbons", Technical Publication No. 225, (1958). The MON and RON were calculated using the compounds measured in the light gasoline fraction and include the following components: 2-methylbutane; n-pentane; 2,3-dimethylbutane; 2-methylpentane; 3-methylpentane; n-hexane; methylcyclopentane; 2,4-dimethylbutane; cyclohexane; and benzene. The "Conversion" is the weight percent of the feedstock converted to products boiling below 420° F. The following products (as wt. % based on feedstock) are reported in Tables A, B and C: "% $C_1$ to $C_4$" = the products containing from one to five carbon atoms; "% $C_3$" = products containing three carbon atoms; "% $C_5$ to 185° F." = products containing at least 5 carbon atoms and boiling below 185° F.; "C185–420" = products boiling from 185° F. to 420° F.; and "$C_5$ to 420° F." = products containing at least 5 carbon atoms and boiling under 420° F.

The $C_5$, $C_6$, $C_7$, $C_8$ and $C_9$ products are reported below. The following products were measured in each case: "$C_5$" = n-pentane and 2-methylbutane; "$C_6$" = n-hexane, 2,3-dimethylbutane, 2-methylpentane and 3-methylpentane; "$C_7$" = n-heptane, 2-methylhexane, 3-methylhexane and 2,4-dimethylpentane; "$C_8$" = n-octane, 2,2,3-trimethylpentane, 2,4-dimethylhexane, 2,3dimethylhexane, 2-methylheptane, 3,4-dimethylhexane and 3-methylheptane; "$C_9$" = n-nonane, 2,4-dimethylheptane, 2,6-dimethylheptane, 2,5-dimethylheptane, 4-methyloctane, 2-methyloctane and 3-methyloctane. The products are reported on a weight basis. The products are determined by the simulated distillation described in ASTM test method 2887.

Comparison of the product distribution obtained using Catalyst A and those obtained using Catalysts B and C demonstrate the improved octane number of the light gasoline fraction ($C_5$ to 185° F.) obtained using the catalysts of this invention when compared at similar conversion. Further, the $C_5$ and $C_6$ hydrocarbon iso/normal ratio increased for Catalysts B and C. Since iso-alkanes have higher octane numbers, the product obtained by use of Catalysts B and C have improved calculated octane numbers.

Figure 3:
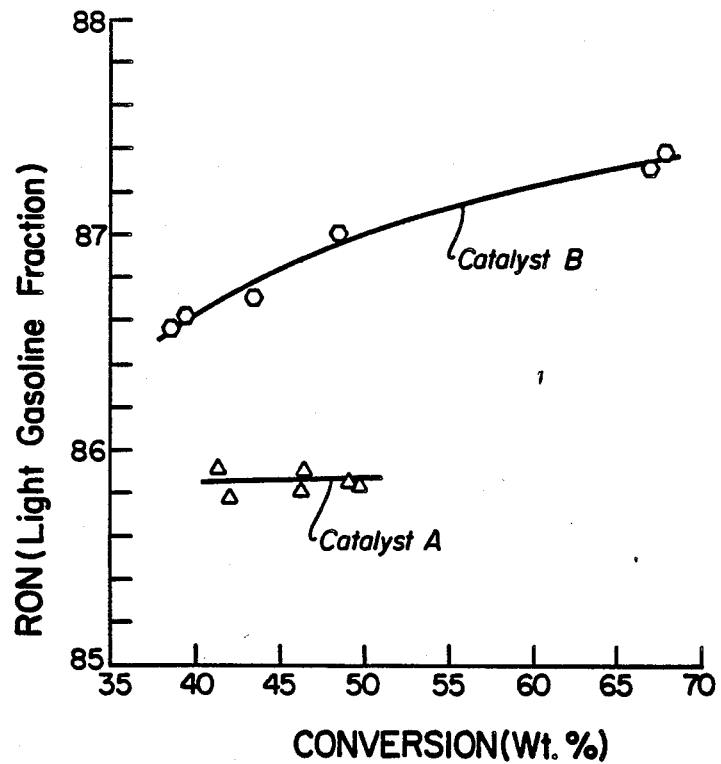
FIG. 3 is a plot of the RON (Research Octane Number) of the light gasoline fraction as a function of conversion for Catalyst A and Catalyst B.
Figure 4:
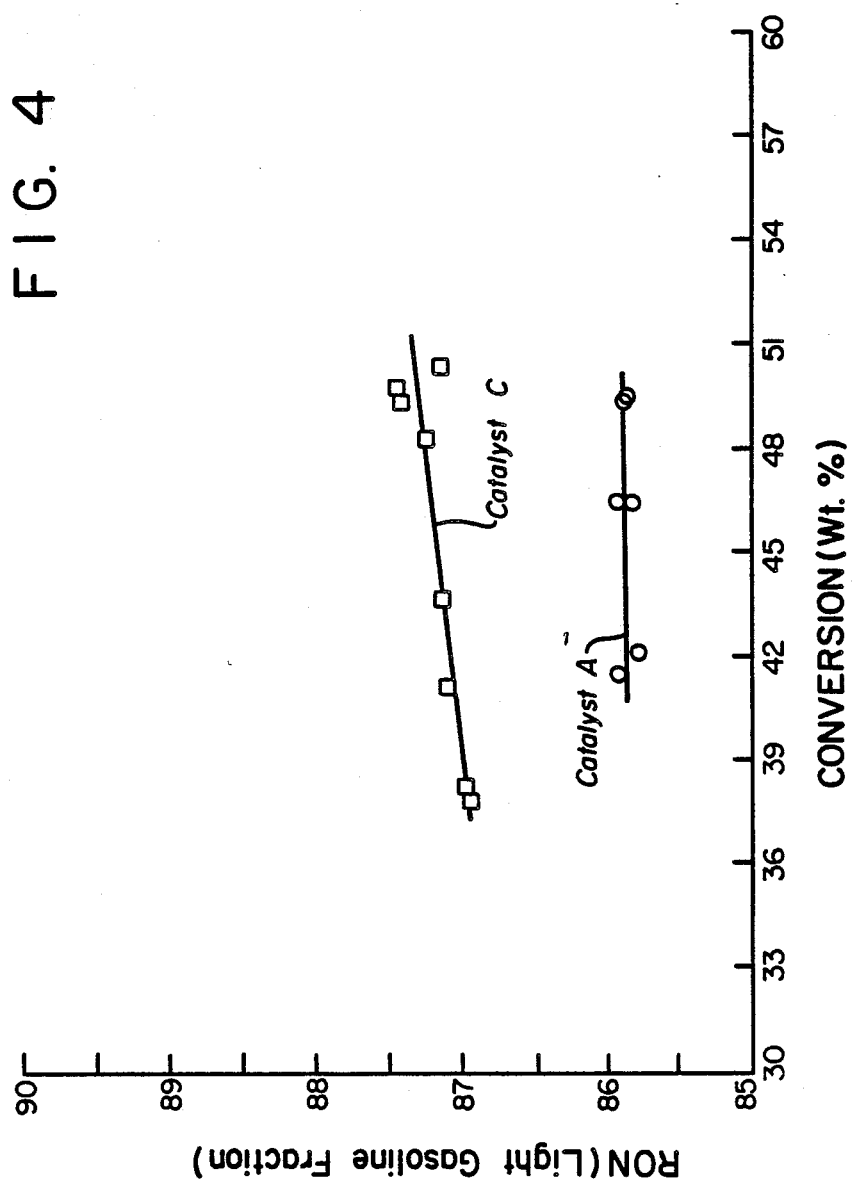
FIG. 4 is similar to FIG. 3 except Catalyst C is depicted.
Figure 5:
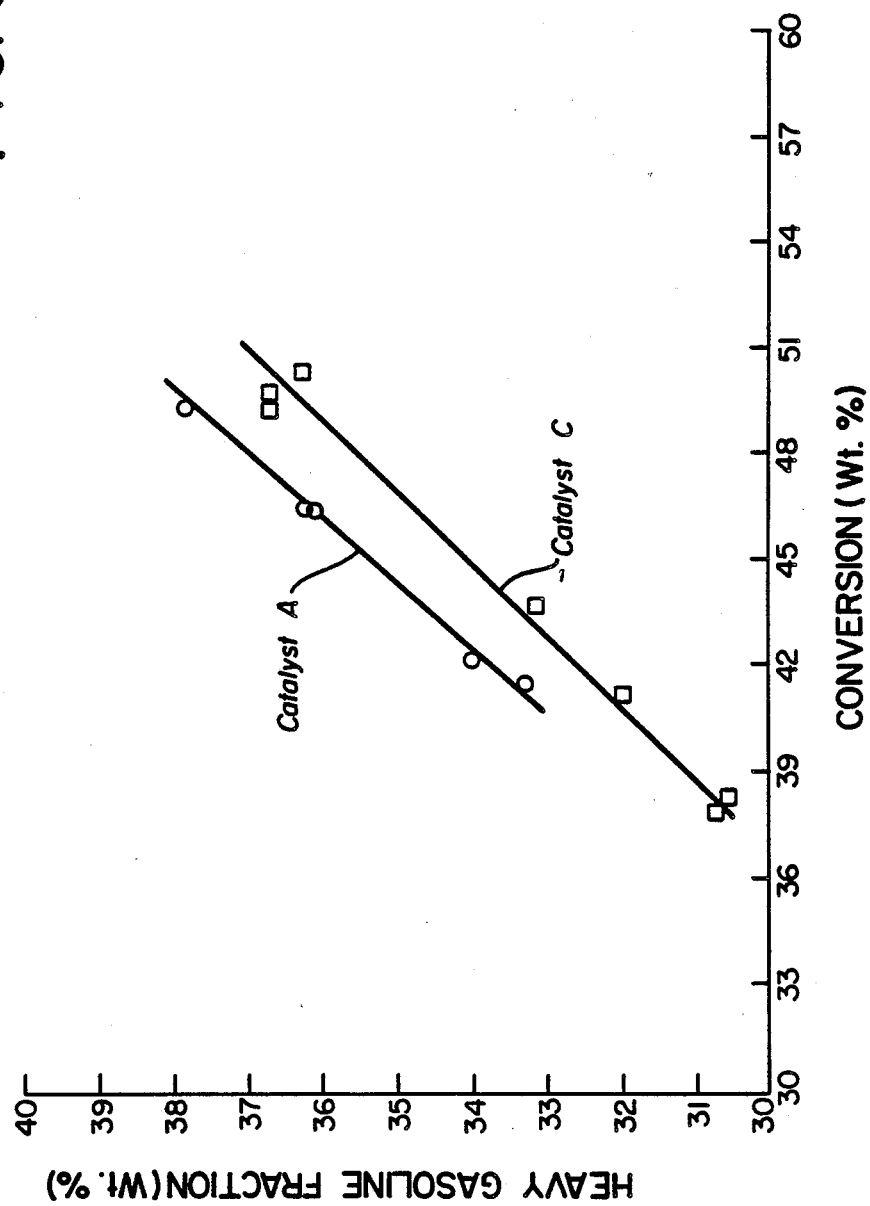
FIG. 5 is a plot of the yield of the heavy gasoline fraction as a function of conversion for Catalyst A and Catalyst C.
Figure 6:
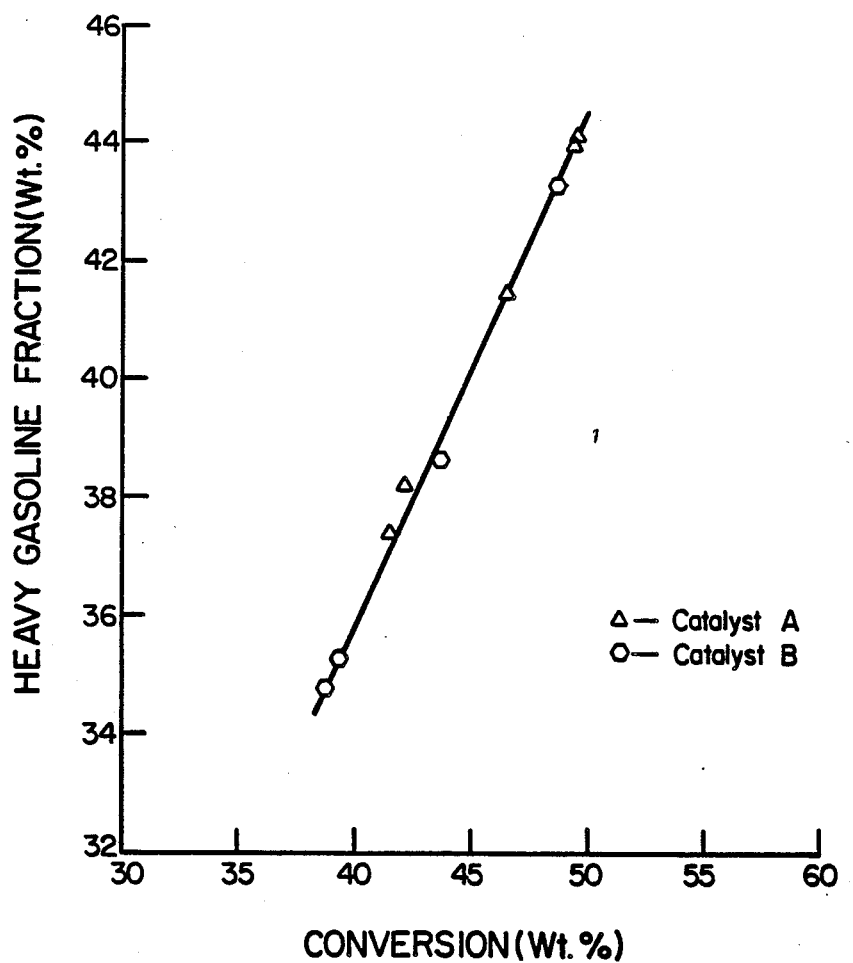
FIG. 6 is a plot of the yield of the heavy gasoline fraction as a function of conversion for Catalyst A and Catalyst B.
Figure 7:
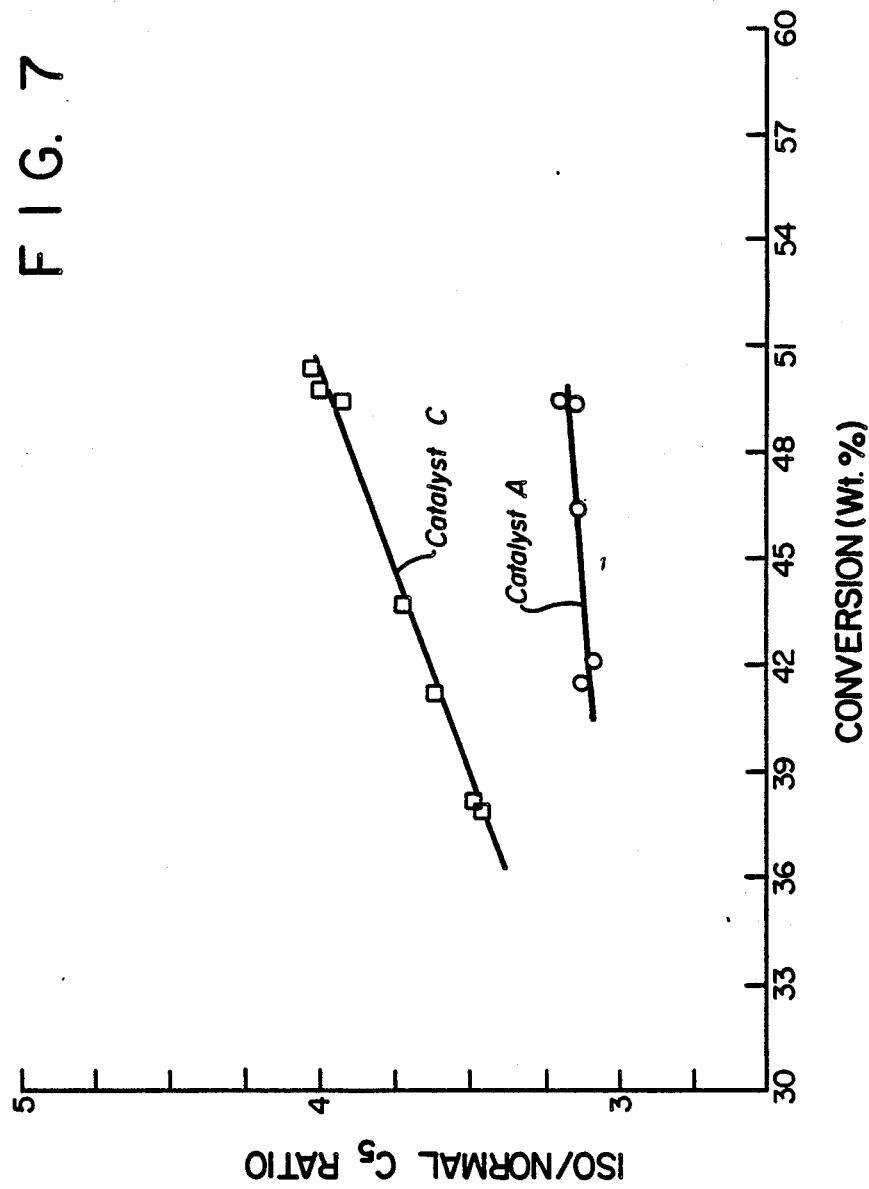
FIG. 7 is a plot of the iso to normal ratio for $C_5$ hydrocarbons as a function of conversion for Catalyst A and Catalyst C.
Figure 8:
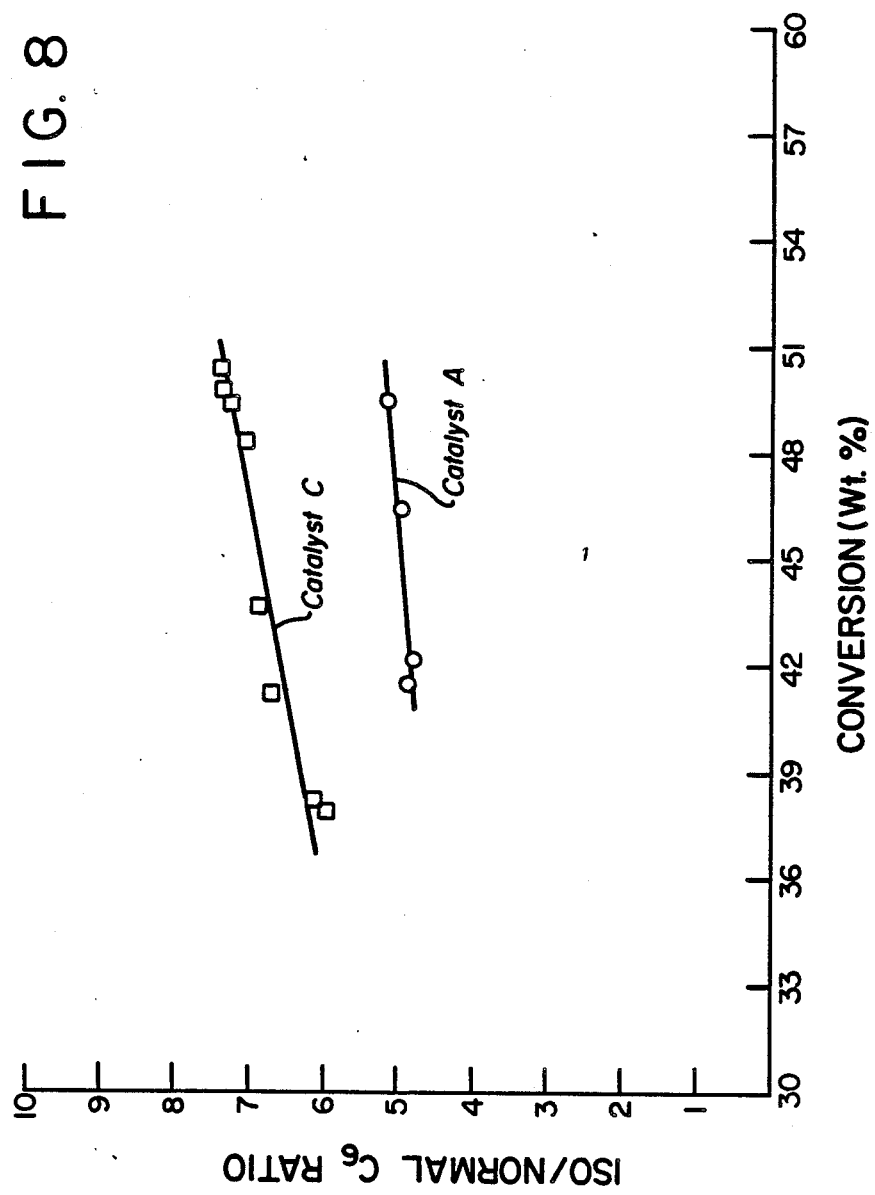
FIG. 8 is a plot of the iso to normal ratio for $C_6$ hydrocarbons as a function of conversion for Catalyst A and Catalyst C.
Figure 9:
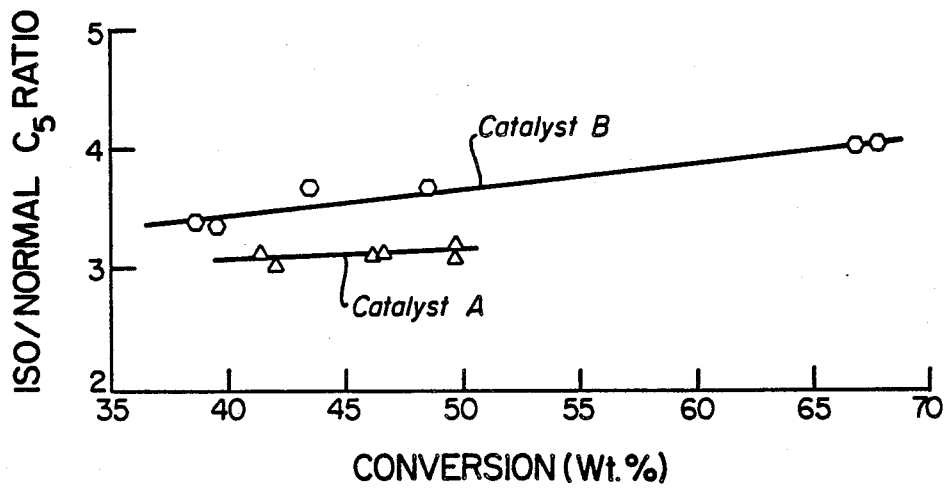
FIG. 9 is a plot of the iso to normal ratio for $C_5$ hydrocarbons as a function of conversion for Catalyst A and Catalyst B.
Figure 10:
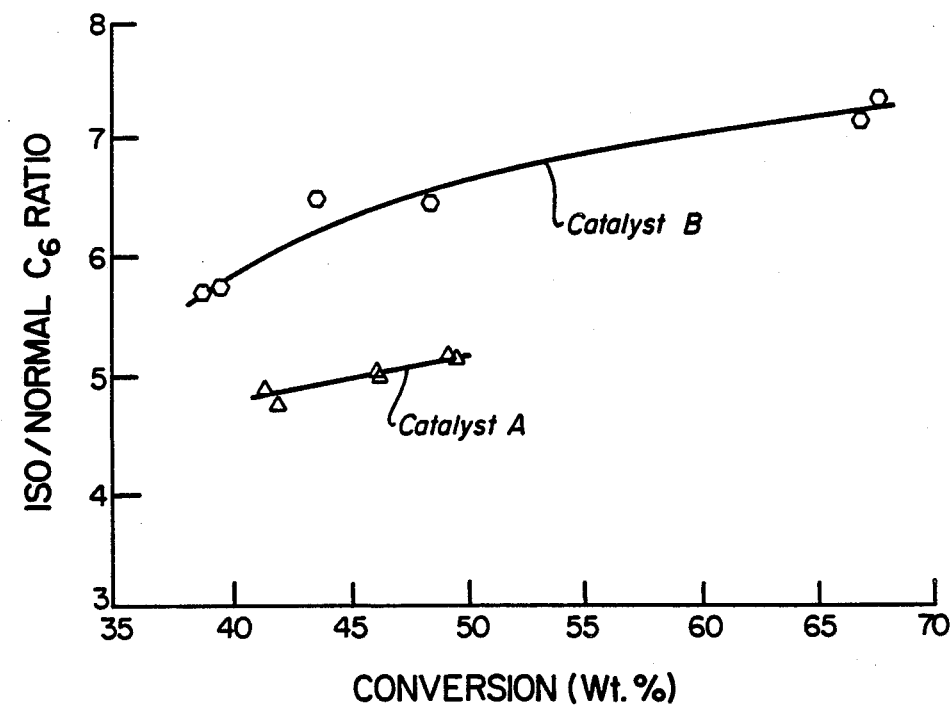
FIG. 10 is a plot of the iso to normal ratio for $C_6$ hydrocarbons as a function of conversion for Catalyst A and Catalyst B.
Figure 11:
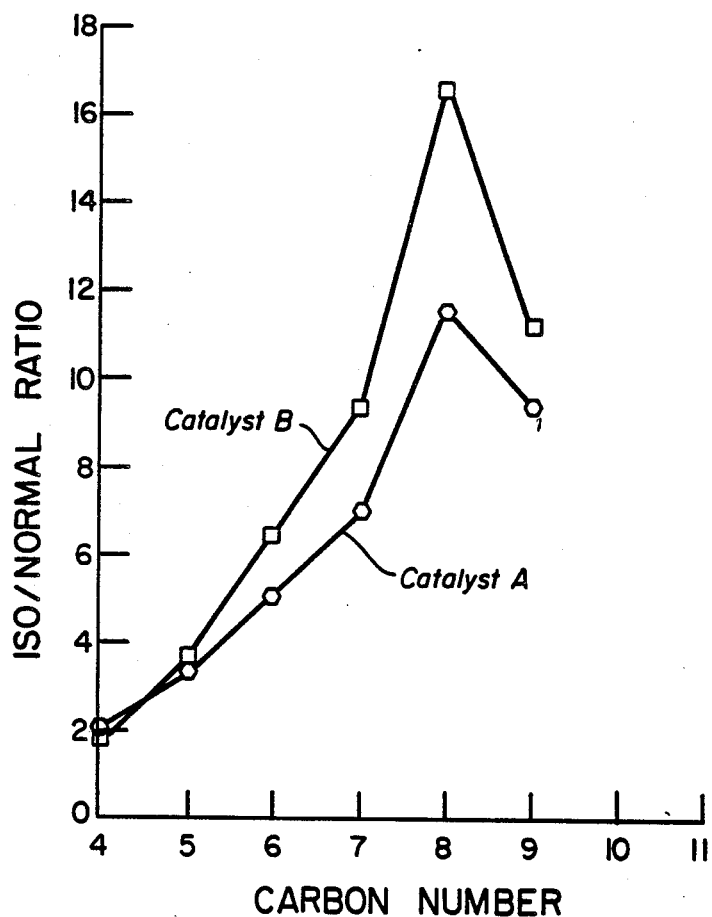
FIG. 11 is a plot of the iso to normal ratio as a function of the carbon number for Catalyst A and Catalyst B.
Figure 12:
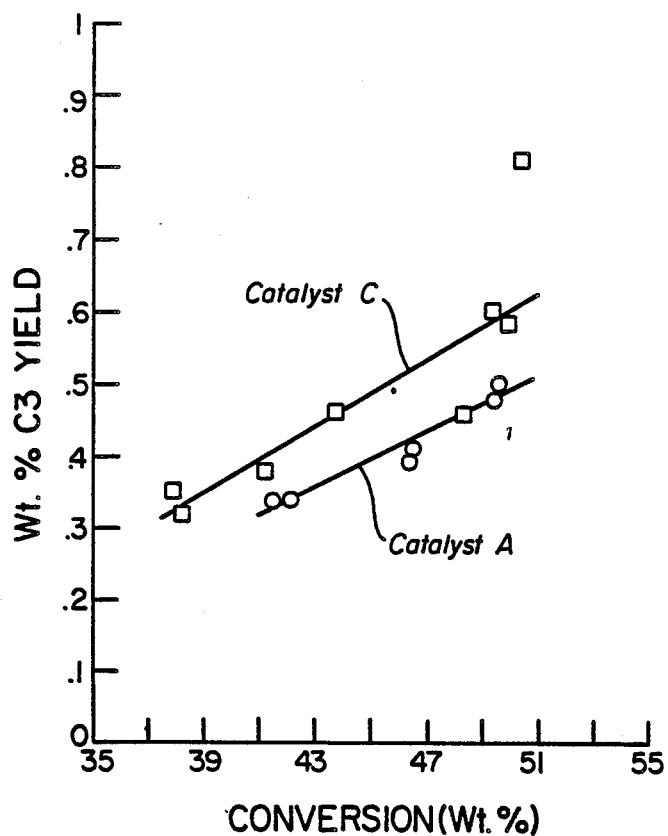
FIG. 12 is a plot of the $C_3$ yield as a function of conversion for Catalyst A and Catalyst C.
Figure 13:
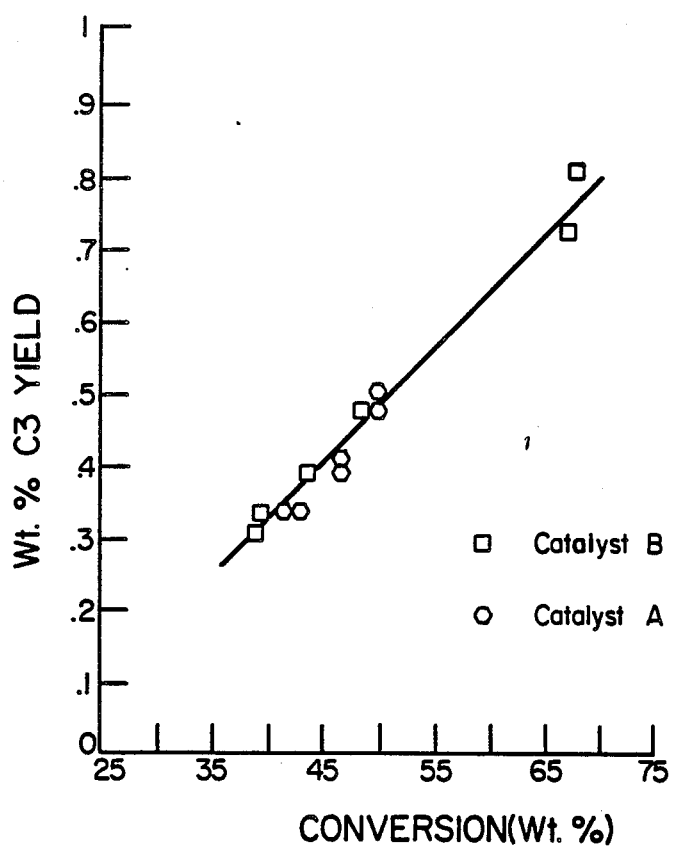
FIG. 13 is a plot of the $C_3$ yield as a function of conversion for Catalyst A and Catalyst B.

The data in Tables A, B and C are graphically depicted in FIGS. 1 to 13 and demonstrate the benefits obtained by use of the catalysts of the instant invention in hydrocracking processes. FIGS. 1 and 2 show a comparison between Catalysts A, B and C of the light gasoline yield ($C_5$-185° F.) as a function of conversion. Catalysts B and C produced similar or higher yields of the light gasoline product as compared to that obtained by use of reference Catalyst A. FIGS. 3 and 4 compares the calculated RON (Research Octane Number) of the light gasoline fractions obtained by use of Catalyst A, B and C. Catalysts B and C produced light gasoline fractions having higher RON values as compared to the light gasoline fractions produced by use of Catalyst A. FIG. 5 compares the yield of the heavy gasoline fraction ($C_5$ to 420° F.) as a function of conversion for Catalyst A and C and shows that the reference catalyst produced more heavy gasoline product. FIG. 6 compares the yield of the heavy gasoline fraction as a function of conversion for Catalyst A and Catalyst B. Surprisingly, the yield of the heavy gasoline fraction is similar to reference Catalyst A while The RON of the light gasoline fraction is improved with Catalyst B. FIGS. 7, 8, 9 and 10 compare the iso to normal ratios of the $C_5$ and $C_6$ hydrocarbons produced by use of Catalysts A, B and C. In each of these cases, Catalysts B and C produced products having a higher iso to normal ratio than the products produced by use of Catalyst A. FIG. 11 compares the iso to normal ratio of the $C_5$, $C_6$, $C_7$, $C_8$ and $C_9$ hydrocarbons as a function of carbon number for Catalyst A and Catalyst B. The products obtained using Catalyst B showed a higher iso to normal ratio for $C_5$, $C_6$, $C_7$, $C_8$ and $C_9$ hydrocarbons, thus indicating higher octane products. FIGS. 12 and 13 show the yield of $C_3$ products as a function of conversion for Catalysts A, B and C. Catalyst C showed a slight increase in $C_3$ products, as compared to Catalyst A, while Catalyst B was similar to Catalyst A in the yield of $C_3$ products.

The above results demonstrate that the RON of the light gasoline fraction was improved by use of Catalyst B and Catalyst C and the iso to normal ratio of $C_5$ to $C_9$ products increased while the yield of the light gasoline and heavy gasoline fractions remained substantially unchanged or increased. Thus, the octane number of the light gasoline fraction obtained using the SAPO-containing catalysts was increased relative to the same catalyst but without a SAPO component. The results also indicated that Catalyst B (containing SAPO-11) was superior to Catalyst C (containing SAPO-34) in its improvement of the octane number of the light gasoline products without a gasoline yield loss. SAPO-11 is characterized by the above discussed adsorption of isobutane while SAPO-34 is not and accordingly, SAPO-11 is in the class of preferred SAPOs for use in the catalysts of this invention.

TABLE A (Catalyst A)

| Experiment No. | Conv. | $C_1$–$C_4$ | $C_3$ | $C_5$-185° F. | 185–420° F. | RON | MON | i/n-$C_5$ | n-$C_5$ | i-$C_5$ | i/n-$C_6$ | n-$C_6$ | i-$C_6$ | n-$C_7$ |
|---|---|---|---|---|---|---|---|---|---|---|---|---|---|---|
| 1 | 42.12 | 3.85 | 0.34 | 4.20 | 33.99 | 85.78 | 80.52 | 3.08 | 0.40 | 1.23 | 4.79 | 0.29 | 1.41 | 0.567 |
| 2 | 41.47 | 3.91 | 0.34 | 4.15 | 33.28 | 85.91 | 80.64 | 3.12 | 0.40 | 1.23 | 4.88 | 0.29 | 1.40 | 0.586 |
| 3 | 46.46 | 4.50 | 0.41 | 5.26 | 36.21 | 85.90 | 80.69 | 3.13 | 0.51 | 1.60 | 4.99 | 0.36 | 1.77 | 0.687 |
| 4 | 46.40 | 4.40 | 0.41 | 5.38 | 36.09 | 85.82 | 80.46 | 3.13 | 0.51 | 1.61 | 5.00 | 0.37 | 1.84 | 0.593 |
| 5 | 49.39 | 4.94 | 0.48 | 6.23 | 37.79 | 85.87 | 80.51 | 3.15 | 0.60 | 1.89 | 5.15 | 0.42 | 2.15 | 0.741 |
| 6 | 49.50 | 5.07 | 0.50 | 6.41 | 37.68 | 85.85 | 80.42 | 3.20 | 0.60 | 1.93 | 5.15 | 0.43 | 2.23 | 0.608 |

| Experiment No. | i-$C_7$ | i/n-$C_7$ | n-$C_8$ | i-$C_8$ | i/n-$C_8$ | n-$C_9$ | i-$C_9$ | i/n-$C_9$ | Hours on Stream | (° F.) |
|---|---|---|---|---|---|---|---|---|---|---|
| 1 | 3.70 | 6.53 | 0.428 | 4.29 | 10.02 | 0.424 | 3.80 | 8.97 | 68 | 686 |
| 2 | 3.91 | 6.66 | 0.415 | 4.59 | 11.06 | 0.431 | 3.98 | 9.23 | 93 | 687 |
| 3 | 4.75 | 6.91 | 0.485 | 6.34 | 13.06 | 0.446 | 4.29 | 9.63 | 118 | 692 |
| 4 | 4.05 | 6.83 | 0.454 | 5.60 | 12.33 | 0.428 | 4.03 | 9.42 | 141 | 961 |
| 5 | 5.26 | 7.10 | 0.540 | 6.91 | 12.79 | 0.482 | 4.84 | 10.03 | 164 | 695 |
| 6 | 4.31 | 7.09 | 0.471 | 5.89 | 12.50 | 0.455 | 4.27 | 9.37 | 188 | 695 | and C. Catalysts B and C produced light gasoline frac-

TABLE B (Cataystt B)

Experiment

TABLE B-continued
(Catayst B)

| No. | Conv. | C$_1$-C$_4$ | C$_3$ | C$_5$-185° F. | 185-420° F. | RON | MON | i/n-C$_5$ | n-C$_5$ | i-C$_5$ | i/n-C$_6$ | n-C$_6$ | i-C$_6$ | n-C$_7$ |
|---|---|---|---|---|---|---|---|---|---|---|---|---|---|---|
| 1 | 38.82 | 3.69 | 0.31 | 3.79 | 31.03 | 86.58 | 80.91 | 3.38 | 0.34 | 1.15 | 5.68 | 0.23 | 1.31 | 0.417 |
| 2 | 39.38 | 3.90 | 0.33 | 3.76 | 31.55 | 86.61 | 80.98 | 3.37 | 0.34 | 1.13 | 5.75 | 0.23 | 1.30 | 0.451 |
| 3 | 43.55 | 3.32 | 0.39 | 4.89 | 33.82 | 87.10 | 81.09 | 3.67 | 0.41 | 1.52 | 6.51 | 0.27 | 1.74 | 0.420 |
| 4 | 48.47 | 4.70 | 0.48 | 5.55 | 37.79 | 87.01 | 81.09 | 3.68 | 0.48 | 1.75 | 6.46 | 0.31 | 1.97 | 0.484 |
| 5 | 66.99 | 7.18 | 0.73 | 10.41 | 48.32 | 87.33 | 81.21 | 4.04 | 0.85 | 3.42 | 7.10 | 0.53 | 3.80 | 0.561 |
| 6 | 67.84 | 7.14 | 0.81 | 9.73 | 49.98 | 87.39 | 81.19 | 4.08 | 0.78 | 3.19 | 7.27 | 0.49 | 3.57 | 0.553 |

| Experiment No. | i-C$_7$ | i/n-C$_7$ | n-C$_8$ | i-C$_8$ | i/n-C$_8$ | n-C$_9$ | i-C$_9$ | i/n-C$_9$ | Hours on Stream | (° F.) |
|---|---|---|---|---|---|---|---|---|---|---|
| 1 | 3.41 | 8.18 | 0.295 | 4.76 | 16.14 | 0.335 | 3.54 | 10.58 | 68 | 686 |
| 2 | 3.73 | 8.27 | 0.327 | 5.20 | 15.90 | 0.357 | 3.84 | 10.75 | 92 | 685 |
| 3 | 4.01 | 9.55 | 0.297 | 5.04 | 16.98 | 0.327 | 3.85 | 11.78 | 140 | 692 |
| 4 | 4.52 | 9.34 | 0.362 | 5.93 | 16.38 | 0.358 | 4.13 | 11.55 | 165 | 696 |
| 5 | 5.61 | 10.0 | 0.387 | 6.89 | 17.80 | 0.388 | 4.62 | 11.90 | 212 | 708 |
| 6 | 5.71 | 10.3 | 0.399 | 6.93 | 17.35 | 0.388 | 4.66 | 12.00 | 236 | 707 |

TABLE C
(CATALYST C)

| Experiment No. | Conv. | C$_3$ | C$_1$-C$_4$ | C$_5$-185° F. | 185-420° F. | RON | MON | i/n-C$_5$ | n-C$_5$ | i-C$_5$ | i/n-C$_6$ | n-C$_6$ | i-C$_6$ | Hours on Stream | (° F.) |
|---|---|---|---|---|---|---|---|---|---|---|---|---|---|---|---|
| 1 | 37.89 | 0.35 | 3.72 | 3.37 | 30.73 | 86.94 | 81.07 | 3.44 | 0.29 | 1.01 | 5.97 | 0.19 | 1.16 | 64 | 686 |
| 2 | 38.18 | 0.32 | 3.62 | 3.53 | 30.58 | 86.96 | 81.22 | 3.48 | 0.32 | 1.10 | 6.4 | 0.20 | 1.22 | 86 | 686 |
| 3 | 41.18 | 0.38 | 3.71 | 4.29 | 31.98 | 87.09 | 81.06 | 3.52 | 0.37 | 1.35 | 6.69 | 0.23 | 1.54 | 110 | 690 |
| 4 | 48.30 | 0.46 | 4.19 | 4.91 | 30.64 | 87.23 | 81.19 | 3.75 | 0.42 | 1.59 | 7.06 | 0.25 | 1.78 | 138 | 695 |
| 5 | 43.70 | 0.46 | 4.53 | 5.45 | 33.12 | 87.13 | 81.10 | 3.72 | 0.47 | 1.74 | 6.85 | 0.29 | 1.97 | 160 | 695 |
| 6 | 49.41 | 0.60 | 5.25 | 6.56 | 36.69 | 87.40 | 81.22 | 3.93 | 0.54 | 2.13 | 7.24 | 0.33 | 2.39 | 184 | 703 |
| 7 | 49.80 | 0.59 | 5.39 | 7.00 | 36.68 | 87.42 | 81.11 | 4.00 | 0.56 | 2.24 | 7.36 | 0.35 | 2.58 | 208 | 703 |
| 8 | 50.41 | 0.81 | 5.58 | 7.43 | 36.24 | 87.13 | 80.12 | 4.03 | 0.53 | 2.15 | 7.38 | 0.39 | 2.89 | 231 | 709 |

EXAMPLE 7

A catalyst was prepared employing SAPO-11 to demonstrate the hydrocracking and dewaxing functionality of the catalyst of this invention. SAPO-11 was prepared according to the procedure described in example 18 of U.S. Pat. No. 4,440,871, except the final molar ratio of di-n-propylamine to Al$_2$O$_3$ was 1.0 to 1. The catalyst was prepared by mixing 150 grams of SAPO-11 with 100 grams of Kaiser medium density alumina and a sufficient amount of water to form an extrudate mixture (paste). The mixture was extruded in 1/16 inch extrudates and dried in air at 100° C. for 16 hours. The extrudates were then calcined in air at 480° C. for 2 hours. The extrudates (153 gram) were then mixed (pore filled) with 150 cc of an aqueous solution containing 40.0 grams of nickel nitrate hexahydrate and 48.8 grams of ammonium metatungstate. The mixture was then dried for 16 hours at 100° C. and then calcined at 480° C for 2 hours. The catalyst was prepared to contain, given as the weight percent oxide: 5 wt. % NiO; 23 wt. % WO$_3$; 36 wt. % SAPO-11; and 36% Al2O3. Chemical analysis for NiO and WO$_3$ gave 5.4 wt. % NiO and 23.0 wt. % WO$_3$.

The catalyst was evaluated by contacting a selected feedstock with hydrogen at a total pressure of 2000 psig at a Liquid Hourly Space Velocity (LHSV) of one and a hydrogen flow rate of 10,000 SCFB (Standard Cubic Feed per Barrel) at temperatures between about 700° F. and 840° F. Products boiling below 600° F. were collected and evaluated and the conversion given based on these products. The feedstock employed in this example was a vacuum gas oil having an IBP (Initial Boiling Point) of 560° F. and a FBP (Final Boiling Point) of 1148° F. (both determined by ASTM test method D-2887), API Gravity of 22.3 and having a pour point of greater than 95° F. The feedstock was characterized by the following physical and chemical characteristics:

|  | Weight Percent |
|---|---|
| Paraffins | 24.1 |
| Mono-naphthenes | 9.5 |
| Poly-naphthenes | 8.7 |
| Mono-aromatics | 13.3 |
| Di-aromatics | 9.3 |
| Tri-aromatics | 4.3 |
| Tetra-aromatics | 2.7 |
| Penta-aromatics | 0.7 |

The reactor effluents were collected and the fraction of the feed (weight basis) converted to products boiling below 600° F. determined by simulated distillation. The conversion is reported as the weight percent of feedstock converted to products boiling below 600° F. The pour points were determined according to ASTM test method D-97-66 on the reactor effluent after maintaining the effluent at about 130° F. during its collection.

The conversion and pour point were as follows:

| Temperature (°F.) | Conversion | Pour Point (°F.) |
|---|---|---|
| 700 | 7.52 | 85 |
| 724 | 9.84 | 80 |
| 749 | 17.95 | 70 |
| 769 | 30.06 | 55 |
| 788 | 41.60 | 25 |
| 797 | 36.64 | 35 |
| 788 | 29.89 | 40 |
| 788 | 33.74 | 45 |
| 807 | 43.64 | 30 |
| 821 | 5.12 | 30 |
| 822 | 45.50 | 30 |
| 840 | 56.88 | 20 |

The above data demonstrate the conversion of the higher boiling feedstock to lower boiling products in the presence of hydrogen and that such products are characterized by a lower pour point than the initial feedstock.

What is claimed is:

1. A hydrocracking process for processing a hydrocarbon feedstock in the presence of hydrogen comprising contacting at hydrocracking process conditions a hydrocarbon feedstock boiling between about 400° F. and about 1200° F. and hydrogen with a hydrocracking conversion catalyst comprising a traditional hydrocracking catalyst component comprising a large pore zeolite and an amount of at least one hydrogenation component selected from the group consisting of cobalt, nickel, molybdenum, tungsten, platinum, palladium, chromium, rhodium, ruthenium and iridium effective to provide the hydrogenation function of the hydrocracking catalyst and further comprising an effective amount of at least one silicoaluminophosphate (SAPO) characterized in its calcined form by an adsorption of isobutane of at least 2 percent by weight at a partial pressure of 500 torr and a temperature of 20° C.

2. The process of claim 1 wherein said SAPO is characterized in its calcined form by an adsorption of triethylamine from zero to less than 5 percent by weight at a practical pressure of 2.6 torr and a temperature of 22° C.

3. The process of claim 1 wherein said large pore zeolite is selected from the group consisting of zeolite Y, ultrastable zeolite Y, faujasite, LZ-210, LZ-10, and mixtures thereof.

4. The process of claim 3 wherein the weight ratio of the large pore zeolite to said SAPO is between about 1:10 and about 50:1.

5. The process according to claim 1 wherein said large pore zeolite contains an effective amount of a cation selected from the group consisting of ammonium, Group IIA, Group IIIA, Groups IIB to VIIB, cerium, lanthanum, praseodymium, neodymium, promethium, samarium, europium, gadolinium, terbium, dysprosium, holmium, erbium, thulium, ytterbium, lutetium, and mixtures thereof.

6. The process of claim 1 wherein said SAPO contains hydrogen or a hydrogenation cation.

7. The process of claim 1 wherein said hydrocracking conditions include a temperature between about 400° F. and about 1600° F., at a pressure between about 400 psig and about 4000 psig.

8. The process of claim 1 wherein said zeolite contains between about 0.1 percent and about 20 weight percent of a multivalent cation.

9. The process of claim 1 wherein said hydrocarbon conversion catalyst contains an inorganic oxide matrix component selected from the group consisting of clays, silicas, aluminas, silica-aluminas, silica-zirconias, silica-magnesia, alumina-borias, alumina-titanias and mixtures thereof.

10. The process of claim 1 wherein said SAPO is selected from the group consisting of SAPO-5, SAPO-11, SAPO-31, SAPO-41 and mixtures thereof.

11. The process of claim 1 wherein said hydrocarbon feedstock is selected from the group consisting of atmospheric gas oils, vacuum gas oils, atmospheric resids, vacuum resids, syncrudes, pulverized coal and mixtures thereof.

12. The process of claim 1 wherein said hydrogenation component of said catalyst is present in an amount between about 0.05 weight percent and about 1.5 weight percent.

13. The process of claim 7 wherein the process is carried out at effective hydrocracking conditions comprising a hydrocarbon feed boiling between about 400° F. and about 900° F., a hydrogen-to-feed ratio of at least 1000 SCFB, a total process pressure of between about 400 and about 4000 psig, a process temperature of between about 450° F. and 800° F. and a space velocity (LHSV) of between 0.2 and 5.

* * * * *